US010732811B1

(12) United States Patent
Pasupuleti et al.

(10) Patent No.: US 10,732,811 B1
(45) Date of Patent: Aug. 4, 2020

(54) VIRTUAL REALITY TRADING TOOL

(71) Applicant: Wells Fargo Bank, N.A., San Francisco, CA (US)

(72) Inventors: Venkata Krupakar Pasupuleti, Jersey City, NJ (US); Darren Michael Muller, Ridgefield, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 74 days.

(21) Appl. No.: 15/671,725

(22) Filed: Aug. 8, 2017

(51) Int. Cl.
*G06F 3/0484* (2013.01)
*G06F 3/0482* (2013.01)
*G06Q 40/04* (2012.01)
*H04L 12/58* (2006.01)
*G06F 9/451* (2018.01)

(52) U.S. Cl.
CPC ........ *G06F 3/04847* (2013.01); *G06F 3/0482* (2013.01); *G06F 9/451* (2018.02); *G06Q 40/04* (2013.01); *H04L 51/046* (2013.01)

(58) Field of Classification Search
CPC .... G06F 3/04847; G06F 9/451; G06F 3/0482; G06Q 40/04; H04L 51/046
See application file for complete search history.

(56) References Cited

U.S. PATENT DOCUMENTS

| 6,009,464 | A | * | 12/1999 | Hamilton | ................. | G06F 9/54 709/219 |
| 7,958,453 | B1 | | 6/2011 | Taing | | |
| 8,499,148 | B2 | | 7/2013 | Eng et al. | | |
| 8,572,177 | B2 | * | 10/2013 | Goldman | ............... | G06Q 30/02 705/319 |
| 8,924,269 | B2 | | 12/2014 | Seubert et al. | | |
| 9,305,319 | B2 | | 4/2016 | Maor et al. | | |
| 9,350,560 | B2 | | 5/2016 | Hupfer et al. | | |
| 9,374,394 | B2 | | 6/2016 | Kahn | | |
| 9,483,157 | B2 | | 11/2016 | Leacock et al. | | |
| 9,961,208 | B2 | * | 5/2018 | Boustead | ............... | H04M 3/568 |
| 10,403,050 | B1 | * | 9/2019 | Beall | ........................ | G06T 7/292 |

(Continued)

OTHER PUBLICATIONS

Maria Nikolova "GMO CLick to launch Virtual Reality app for Forex trading" Jan. 27, 2017 7 pages (Year: 2017).*

*Primary Examiner* — Andrea N Long
(74) *Attorney, Agent, or Firm* — Schwegman Lundberg & Woessner, P.A.

(57) ABSTRACT

Various examples are directed to a virtual reality trading tool and methods of using the same. A computing device may receive an indication of a first metric from a first administrator user computing device. The computing device may generate a first value of the first metric for a first plurality of trades requested by a first set of users receiving a first virtual reality user interface (UI) corresponding to a first virtual room and a second value of the first metric for a second plurality of trades requested by a second set of users receiving a second virtual reality UI corresponding to a second virtual room. The computing device may serve an administrator UI to the administrator user computing device. The administrator UI may comprise a first virtual room feature indicating the first value for the first metric and a first join feature associated with the first virtual room feature and selectable by an administrator user of the administrator user computing device to join the first virtual room.

18 Claims, 13 Drawing Sheets

(56) References Cited

U.S. PATENT DOCUMENTS

| | | | |
|---|---|---|---|
| 2001/0034661 A1* | 10/2001 | Ferreira | G06F 3/04815 705/14.4 |
| 2002/0128952 A1* | 9/2002 | Melkomian | G06Q 40/04 705/37 |
| 2002/0133449 A1* | 9/2002 | Segal | G06Q 40/04 705/37 |
| 2003/0126068 A1* | 7/2003 | Hauk | G06Q 30/08 705/37 |
| 2005/0234807 A1* | 10/2005 | Toffey | G06Q 40/00 705/37 |
| 2005/0237377 A1* | 10/2005 | Chapweske | H04N 7/15 348/14.08 |
| 2007/0168359 A1* | 7/2007 | Jacob | A63F 13/12 |
| 2008/0215994 A1* | 9/2008 | Harrison | A63F 13/10 715/757 |
| 2008/0256452 A1* | 10/2008 | Berndt | A63F 13/06 715/728 |
| 2009/0046864 A1* | 2/2009 | Mahabub | H04S 7/30 381/17 |
| 2009/0055325 A1* | 2/2009 | Leventhal | G06Q 40/04 705/36 R |
| 2009/0092259 A1* | 4/2009 | Jot | G10L 19/008 381/17 |
| 2010/0316232 A1* | 12/2010 | Acero | H04M 3/568 381/92 |
| 2011/0096915 A1* | 4/2011 | Nemer | H04M 3/568 379/158 |
| 2012/0131478 A1* | 5/2012 | Maor | G06T 11/60 715/757 |
| 2012/0296972 A1* | 11/2012 | Backer | H04L 65/403 709/204 |
| 2013/0155169 A1* | 6/2013 | Hoover | H04N 7/157 348/14.02 |
| 2013/0203026 A1* | 8/2013 | Sundaresh | G09B 5/00 434/219 |
| 2014/0095397 A1* | 4/2014 | Phillips | G06Q 30/01 705/304 |
| 2014/0108959 A1* | 4/2014 | Choupak | H04L 65/403 715/753 |
| 2014/0162235 A1* | 6/2014 | Marra | G09B 7/00 434/322 |
| 2014/0214629 A1* | 7/2014 | Azam | G06Q 30/0643 705/27.2 |
| 2014/0229866 A1* | 8/2014 | Gottlieb | H04L 65/403 715/758 |
| 2015/0087371 A1* | 3/2015 | Hill | G07F 17/3293 463/11 |
| 2015/0143215 A1* | 5/2015 | Hu | G06F 17/2235 715/205 |
| 2015/0179186 A1* | 6/2015 | Swierk | G06F 17/2235 704/276 |
| 2015/0207642 A1* | 7/2015 | Bradbary | H04L 12/1822 709/204 |
| 2015/0310188 A1 | 10/2015 | Ford et al. | |

* cited by examiner

VIRTUAL REALITY TRADING TOOL

TECHNICAL FIELD

Embodiments described herein generally relate to systems and methods for generating, serving, and monitoring virtual reality user interfaces for facilitating interaction between users and a computing device or systems of computing devices.

BACKGROUND

Traditionally, securities trading has been geographically-focused, with traders often in close physical proximity to one another. In one common arrangement, traders are organized into trading desks, where each trading desk focuses on a particular type of security, a particular client, etc. Traders at the same trading desk are often located in the same geographic area, often clustered in geographic trading centers such as New York, London, etc.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
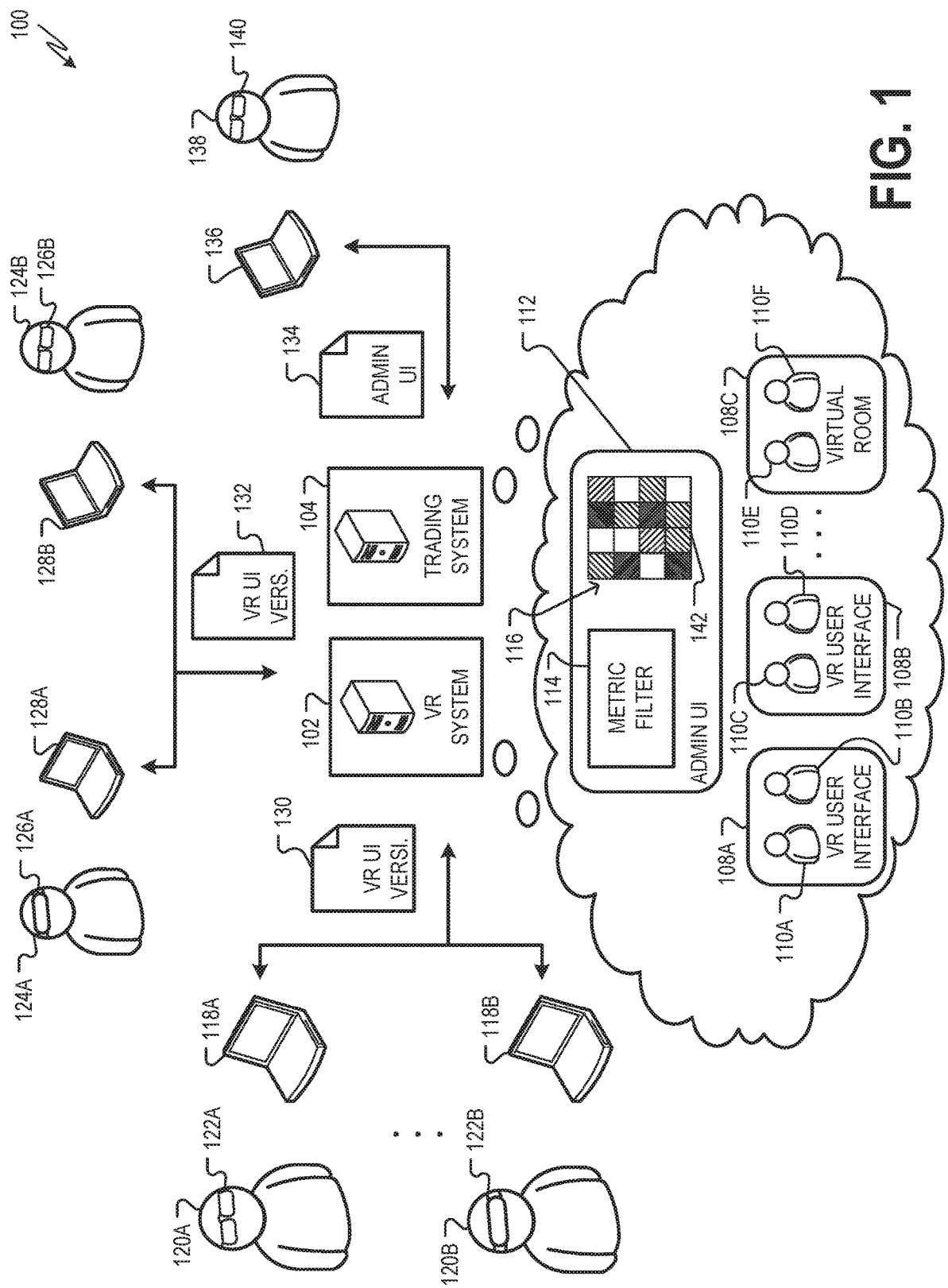
FIG. 1 is a diagram showing one example of an environment for executing a virtual reality trading tool.

Various examples described herein are directed to systems and methods for generating, serving, and administering virtual reality tools for trading. Virtual reality tools may include a virtual reality computing system (a virtual reality system) that generates one or more virtual reality user interfaces (UIs) that are provided to one or more users. The virtual reality UIs, as described herein, may allow trader users, client users, and administrator users to enjoy rich interaction in a trading environment even in situations where the users are not in the same geographic location.

A virtual reality UI may include a visual interface that is viewable by a user to provide the user with a visual field that augments or replaces the visual field otherwise visible to the user. The visual field represents a depiction of a three dimensional virtual space. In some examples, a virtual reality UI may also include audible, tactile, or other similar signals that stimulate the users' other senses in addition to vision.

In some examples, the virtual space depicted by the virtual reality UI includes a virtual room where different users receiving the virtual reality UI can interact with one another, for example, as though the users were in the same physical location. Accordingly, a set of users who are receiving a virtual reality UI are also described as being in a particular virtual room. Users receiving a virtual reality UI may have respective positions within the virtual room. The visual field shown to a particular user may be determined from the user's position in the virtual room. In some examples, users are represented by respective avatars located in the virtual room at the users' respective positions. For example, a user's avatar may be displayed to other users receiving the virtual reality UI.

In some examples, the virtual reality UI is configured to provide a common experience to the users receiving it. For example, the virtual reality UI may include consolidated ambient feedback from some or all of the users receiving the virtual reality UI. Ambient feedback may include one or more visual, audio, and/or haptic signals received from the users. For example, one or more of the users receiving the virtual reality UI may utilize a microphone or other sensor to capture ambient feedback from the environment around the user. The ambient sounds may include, for example, the sound of the user typing on a keyboard, the sound of a telephone ring, sounds of a television or other background noise, etc. The virtual reality system may receive ambient feedback signals from some or all of the set of users receiving the virtual reality UI and generate an aggregated feedback signal, which may be provided to some or all of the set of users receiving the virtual reality UI. The aggregated feedback signal, in some examples, provides the users with a sense of the mood of the virtual room. For example, when the aggregated feedback signal includes frequent typing, phone rings, exclamations, etc., it may indicate to the users that the virtual room is busy. On the other hand, when the aggregated feedback signal includes less frequent typing, phone rings, or other sounds, it may, indicate that the virtual room is less busy.

In some examples, the virtual reality UI may also include an audible, visual, and/or haptic signal that reflects a trade or trades made by users receiving the virtual reality UI. For example, when a trade is completed, the virtual reality system may determine and/or receive an indication of the success of the trade. For example, if the trade is successful, the virtual reality UI may include a trade result signal that results in a visual and/or audible change in the virtual reality UI, such as the sound of people cheering, flashing green lights, etc., that indicates the success of the trade. If the trade is unsuccessful, the trade result signal may include a visual and/or audible signal indicating that the trade was unsuccessful, such as the sound of people jeering, flashing red lights, etc. A trade result may be provided to some or all of the users receiving the virtual reality UI.

The virtual reality UI may allow interactions between some or all of the set of users that are receiving the UI. For example, a first user may change his or her position in the virtual room to approach the position of an avatar of a second user. In some examples, the first user and second user communicate with one another orally, in writing, etc. The virtual reality UI may also allow the set of users receiving the virtual reality UI to view common UI features of the virtual room. For example, the visual field of the virtual reality UI may depict one or more common UT features that are provided to all users of the set of users receiving the virtual reality UI. Common UI features may include, for example, avatars of other users, market information features that provide the users with data regarding one or more markets for securities, communication features for communicating with other users, securities features that show various information about securities, portfolios or trades, etc.

In some examples, a virtual reality UI may be configured to provide different levels of access to different users. Users with different levels of access may be provided with different versions of the virtual reality UI including different UI features. In some examples, a user's level of access may determine an allowed subset of other users that the user can see or with whom the user can interact. For example, a first user may have a level of access that allows the first user to interact with an allowed subset of other users. In the version of the virtual reality UI provided to the first user, the visual field may show avatars for the allowed subset of other users while omitting avatars for users that are not part of the allowed subset. In this way, users outside of the allowed subset may, not be visible to the first user. In some examples, this may also prevent the first user from communicating with users outside of the allowed subset. Also, in some examples, users with different levels of access to the virtual reality UI may be provided with different market information features, securities features, etc.

Differential levels of access for different users of a virtual reality UI may be used in the securities trading context, for example, to allow traders and clients to interact in an appropriate manner. For example, a client may have a portfolio of securities that is managed by a financial services firm represented by one or more traders. A client user associated with the client may receive a version of the virtual reality UI with a level of access that permits the client user to see and/or interact with trader users who work on the client's portfolio and to see and/or interact with other UI features that relate specifically to the client's portfolio and/or to the market in general. In this way, the client user may have a level of access that allows the client user to monitor his or her portfolio without permitting the client user to view confidential information not related to the client's portfolio or, in some examples, to bother traders whose work is not related to the client's portfolio.

In some examples, the virtual reality system also provides an administrator UI to one or more administrator users. The administrator UT may allow an administrator user to monitor the activities of users in one or more virtual rooms (e.g., users receiving one or more virtual reality UIs). In some examples, the administrator UT may also allow the administrator user to communicate with users receiving the various virtual reality UIs, for example, by joining the virtual room (e.g., receiving a version of the virtual reality UT).

The administrator UI may include a set of virtual room features. Each virtual room feature corresponds to a virtual room (e.g., a virtual reality UI provided to a set of one or more users). A virtual room feature may indicate values for metrics describing a virtual room. Example metrics may include a value at risk (VAR) of trades executed by users in the virtual room, a number of trades executed by users in the virtual room, a trade volume by users in the virtual room, etc. For example, a set of virtual room features on an administrator UI may form a heat map indicating where there are particular values for a given metric or metrics. In some examples, the administrator user may select one or more metrics to be indicated by virtual room features. Also, in some examples, one or more of the virtual room features includes a join feature that, when selected by the administrator user, causes the administrator user to receive a version of the virtual reality UI corresponding to the selected virtual room. In this way the administrator user may observe the selected virtual room and, in some examples, interact with users in the virtual room.

FIG. 1 is a diagram showing one example of an environment 100 for executing a virtual reality trading tool. The environment 100 includes a virtual reality system 102 and a trading system 104. The virtual reality (VR) system 102 may provide one or more virtual reality UIs 108A, 108B, 108C and/or administrator UIs 112 to various users 120A, 120B, 124A, 124B, 138. The VR system 102 may include one or more computing devices such as, for example, one or more servers that include one or more processing units and/or memory devices. The one or more computing devices making up the VR system 102 may be located at a common geographic location (e.g., a common data center) and/or may be distributed across multiple geographic locations.

The trading system 104 may receive and/or process trades requested by, one or more of the users 120A, 120B, 124A, 124B, 138. For example, trader users 120A, 120B may send one or more trade requests to the trading system 104. The trading system 104 may process the trade requests, for example, by forwarding the trade requests to a clearinghouse system or other suitable system. The trading system 104 may include one or more computing devices such as, for example, one or more servers that include one or more processing units and/or memory devices. The one or more computing devices making up the trading system 104 may be located at a common geographic location (e.g., a common data center) and/or may be distributed across multiple geographic locations.

Users 120A, 120B, 124A, 124B, 138 may receive one or more of the his 108A, 108B, 108C, 112 via one or more user computing devices 118A, 118B, 128A, 128B, 136, 122A, 1228, 126A, 126B, 140. User computing devices 118A, 118B, 128A, 128B, 136, 122A, 122B, 126A, 126B, 140 may include any suitable computing device such as, for example, a laptop computer, a desktop computer, a tablet computer, a mobile phone, etc.

In some examples, one or more of the users 120A, 120B, 124A, 124B, 140 may access a virtual reality UI 108A, 108B, 108C or administrator UI 134 utilizing user computing devices that are or include a VR computing device 122A, 1228, 126A, 126B, 140. A VR computing device 122A, 1228, 126A, 126B, 140 may be any suitable computing device having a display or displays for providing the visual field of a virtual reality UI 108A, 108B, 108C or other virtual reality UI. In some examples, VR computing devices 122A, 122B, 126A, 126B, 140 are positioned over a user's eyes, allowing the user to see the visual field of the virtual reality UI as either a full or a partial replacement for what the user would otherwise see. In some examples, a VR computing device 122A, 122B, 126A, 126B, 140 may project a visual field of a virtual reality UI directly onto the users' retinas. In some examples, VR computing devices 122A, 122B, 126A, 126B, 140 are used alone. That is, a VR computing device 122A, 122B, 126A, 126B, 140 may communicate directly with the VR system 102 to receive a VR interface, such as 108A, 108B, 108C. In some examples, VR computing devices 122A, 122B, 126A, 126B, 140 may operate in conjunction with other user computing devices 118A, 118B, 128A, 128B, 136. For example, user computing devices 118A, 118B, 128A, 128B, 136 may receive an interface and provide the interface to the VR computing device 122A, 122B, 126A, 126B, 140 for provision to the user 120A, 120B, 124A, 124B, 138.

Virtual reality UIs 108A, 108B, 108C, as described herein, may depict a virtual space including a virtual room. UI features included in the respective virtual rooms may include avatars 110A, 110B, 110C, 110D, 110E, 110F as well as other features, for example, as described in more detail in FIG. 3. Each avatar 110A, 110B, 110C, 110D, 110E, 110F may correspond to a user that is receiving a version of the virtual reality UI 108A, 108B, 108C, such as one of users 120A, 120B, 124A, 124B, 138.

In some examples, different types of users 120A, 120B, 124A, 124B, 138 receive different versions of the virtual reality UIs 108A, 108B, 108C. For example, trader users 120A, 120B may receive a version 130 of the virtual reality UI 108A that includes a first set of UI features. Client users 124A, 124B may receive a version 132 of the virtual reality UI 108A that includes a second set of UI features that is different than the first set of UI features. For example, trader users 120A, 120B may receive UI features that enable the trader users 120A, 120B to request trades while client users 124A, 124B may not receive UI features for requesting trades (e.g., except through a trader user 120A, 120B).

Also, for example, the version 132 of the virtual reality UI 108A that is provided to client users 124A, 124B may include UI features that describe a portfolio or portfolios of a client represented by the client users 124A, 124B while excluding UI features that describe a portfolio or portfolios of another client or clients. On the other hand, some or all of the trader users 120A, 120B may have access to UI features describing the portfolios of more than one client.

The administrator user 138 may receive an administrator UI 134 that describes activities of the various users 120A, 120B, 124A, 124B at the various virtual reality UIs 108A, 108B, 108C. An example screen 112 of the administrator UI 134 is shown in FIG. 1. The screen 112 may include a metric filter 114 and a virtual room field 116 showing various virtual room features, such as the example virtual room feature 142 that is labeled in FIG. 1. Each virtual room feature of the virtual room field 116 may indicate various information about a corresponding virtual reality UI 108A, 108B, 108C such as, for example, values for one or more metrics, etc. In the example shown in FIG. 1, metric values for various virtual rooms shown in FIG. 1 are indicated by color. For example, different colors or textures may correspond to different values for the corresponding metric. The administrator user 138 may select the metric indicated at the virtual room field 116, for example, via the metric filter 114. Additional details of the administrator UI 134 are shown herein with reference to FIGS. 7-10.

Figure 2:
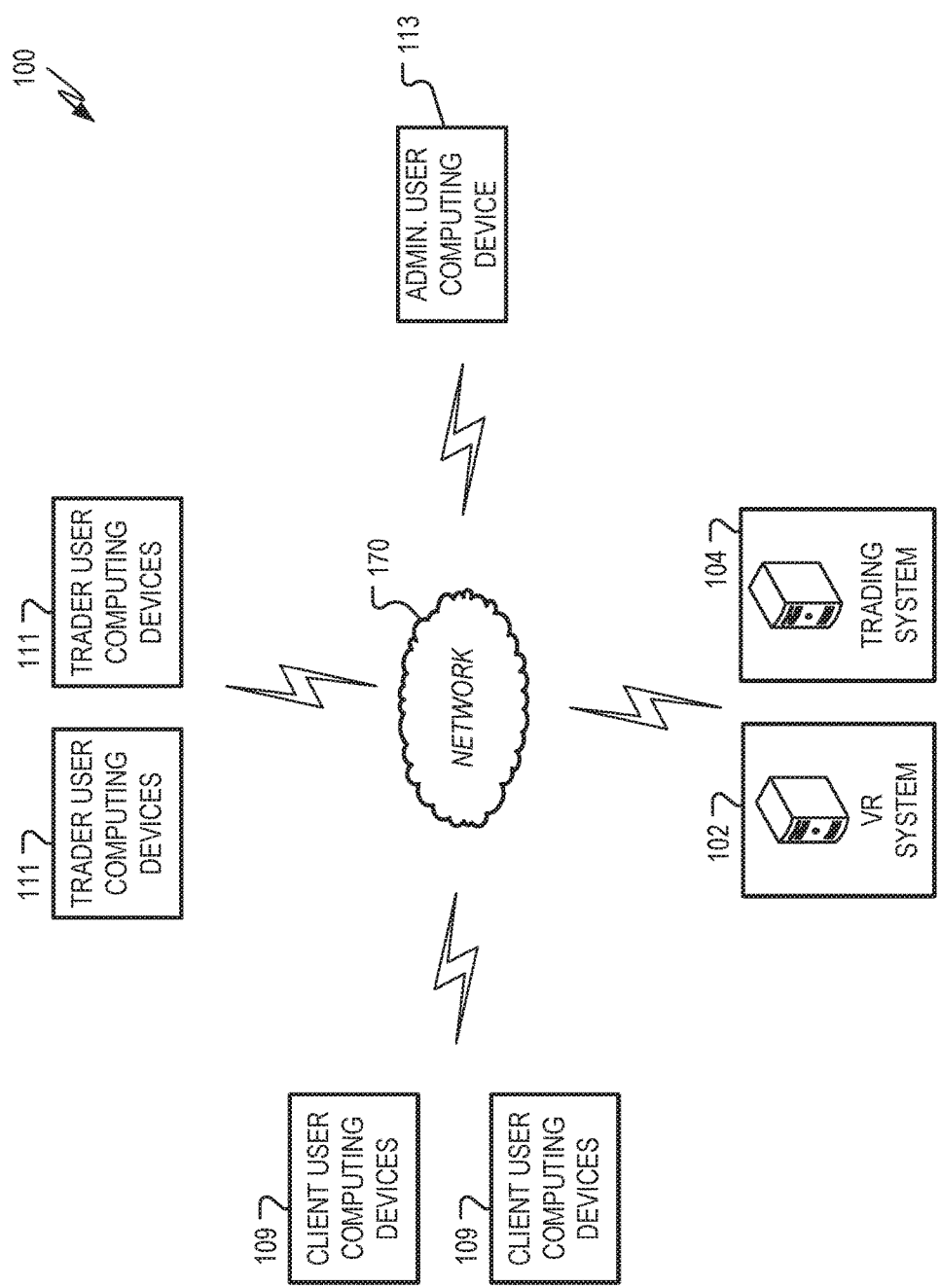
FIG. 2 is a diagram showing another example of the environment of FIG. 1.

FIG. 2 is a diagram showing another example of the environment 100 of FIG. 1. For example, FIG. 2 shows the VR system 102 and trading system 104. FIG. 2 also shows example user computing devices 109, 111, 113, which may be or be similar to the user computing devices 118A, 118B, 128A, 128B, 136, 120A, 120B, 126A, 126B, 140. The various components of the environment 100 may be in communication with one another via a network 170. The network 170 may be or comprise any suitable network element operated according to any suitable network protocol. For example, one or more portions of network 170 may be an ad hoc network, an intranet, an extranet, a virtual private network (VPN), a local area network (LAN), a wireless LAN (MILAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks 170.

Figure 3:
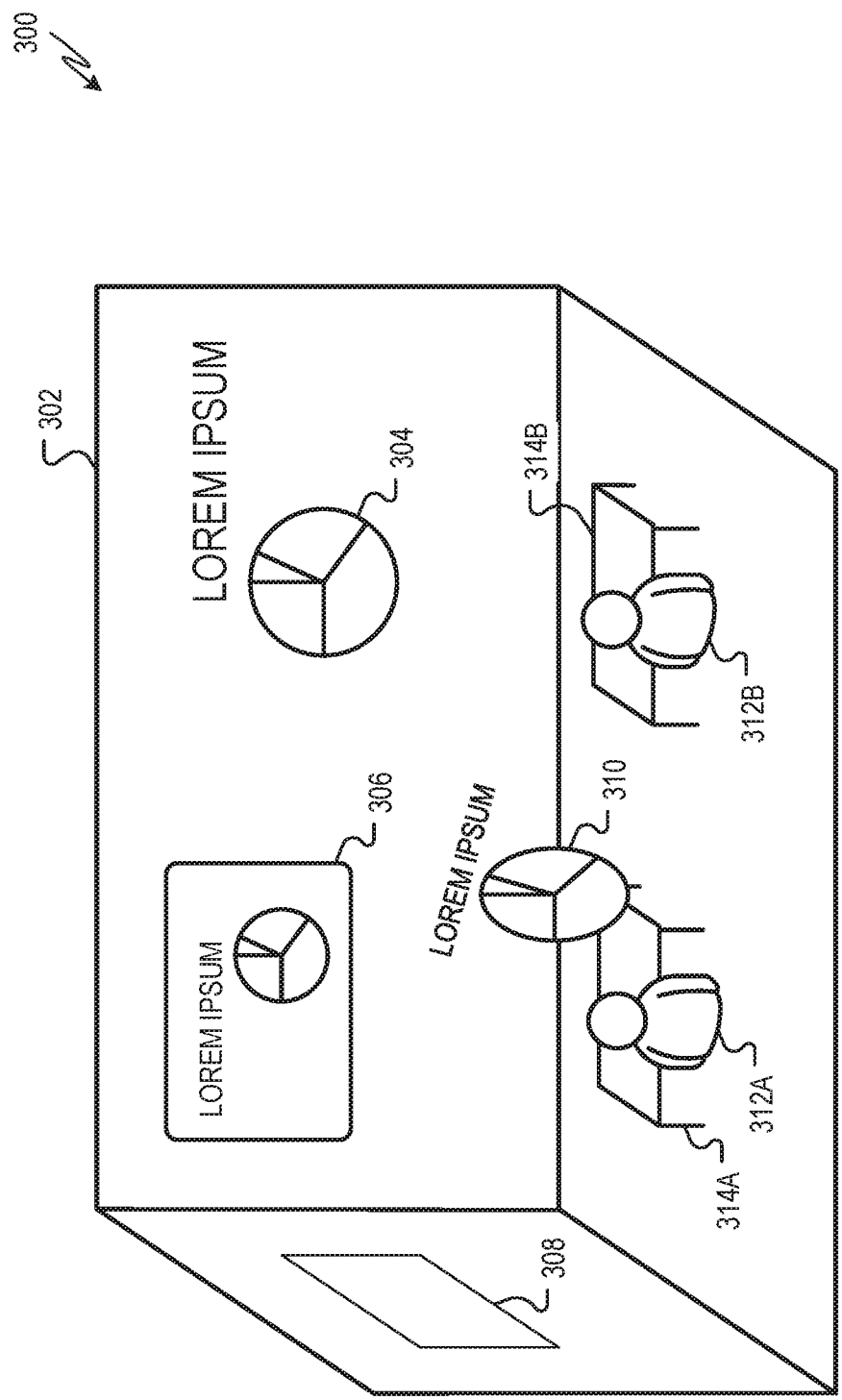
FIG. 3 is a diagram showing one example of a virtual space depicted by a virtual reality LA.

FIG. 3 is a diagram showing one example of a virtual space 300 depicted by a virtual reality UI, such as one of the virtual reality UIs 108A, 108B, 108C of FIG. 1. The virtual space 300 shows example avatars 312A, 312B that may correspond to a user receiving the virtual reality UI depicting the virtual space 300. The virtual space 300 includes an optional wall structure 302. The wall structure 302 may simulate a room, such as a room in an office building or other suitable room. In some examples, the wall structure 302 may be omitted and the virtual space 300 may depict an outdoor location such as, a meadow, a beach, a mountaintop, etc. In some examples, different versions of a virtual realty UI may depict different wall structures 302 or other scenes. For example, a first version of the virtual reality UI provided to a first user may depict a beach while a second version of the virtual reality UI provided to a second user may depict an office room.

In addition to the avatars 312A, 312B, the virtual space 300 includes various UI features including object features 314A, 314B and information features 304, 306, 308, 310. Object features 314A, 314B may include desks, furniture, decorations, etc., that are shown in the virtual space 300. Object features 314A, 314B may be visible to users and/or functional. For example, a desk object feature, such as features 314A, 314B may support other features such as a keyboard object feature, an information features, etc.

Information features 304, 3086, 308, 310 may display various information, for example, about a relevant market, a security, a portfolio of securities, a business sector, or any other information that may be suitable and/or desirable for a trader, client, or other user of the virtual reality UI. Information features 304 may include alphanumeric information, graphical information, or any other suitable information. Also, information features 304 may be positioned at any suitable location in the virtual space 300. In some examples, an information feature, such as 306 and 308, is depicted on a wall structure 302 in a frame that is or appears similar to a television or other monitor. In some examples, an information feature, such as 304, is depicted positioned directly on the wall structure 302 without a frame or other divider. Also, in some examples, an information feature, such as 310, is depicted away from a wall structure 302. For example, information feature 310 may appear to float in place near the avatar 312A, causing the avatar 312A to appear prominently in the field of view of the user corresponding to the avatar 312A.

Figure 4:
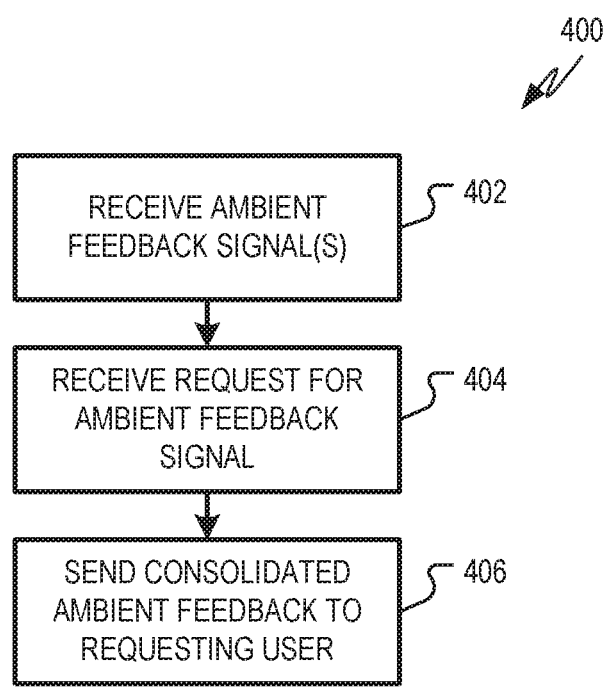
FIG. 4 is a flowchart showing one example of a process flow that may be executed in the environment to provide users with trader feedback.

FIG. 4 is a flowchart showing one example of a process flow 400 that may be executed in the environment 100 (e.g., by the VR system 102) to provide users with ambient feedback. At operation 402, the VR system 102 receives one or more ambient feedback signals. An ambient feedback signal may indicate ambient audible, visual, and/or tactile conditions at the user or users' location. For example, an ambient noise signal may indicate typing on a keyboard, a telephone ringing, etc. Ambient visual signals may include, for example, an indication of the expression on the user's face, etc. Ambient tactile signals may include, for example, vibrations due to user movement (e.g., kicking a desk, finger drumming, etc.). The VR system 102 may store ambient feedback signals received from the one or more users at operation 402.

At operation 404, the VR system 102 may receive a request for an ambient feedback signal from one or more users receiving the virtual reality IA (e.g., an ambient feedback request message). For example, some users may want to receive ambient feedback while others may not. Also, different user may want to receive different types of ambient feedback (e.g., audible, visual, tactile, etc.), but not others. At operation 406, the VR system 102 may send a consolidated ambient feedback signal to the requesting user. The consolidated ambient feedback signal may include any suitable combination of the ambient feedback signals received at operation 402. In some examples, the user requesting the ambient feedback signal at operation 404 may request that the ambient feedback signals of one or more users be omitted from the consolidated ambient feedback provided at operation 406.

Figure 5:
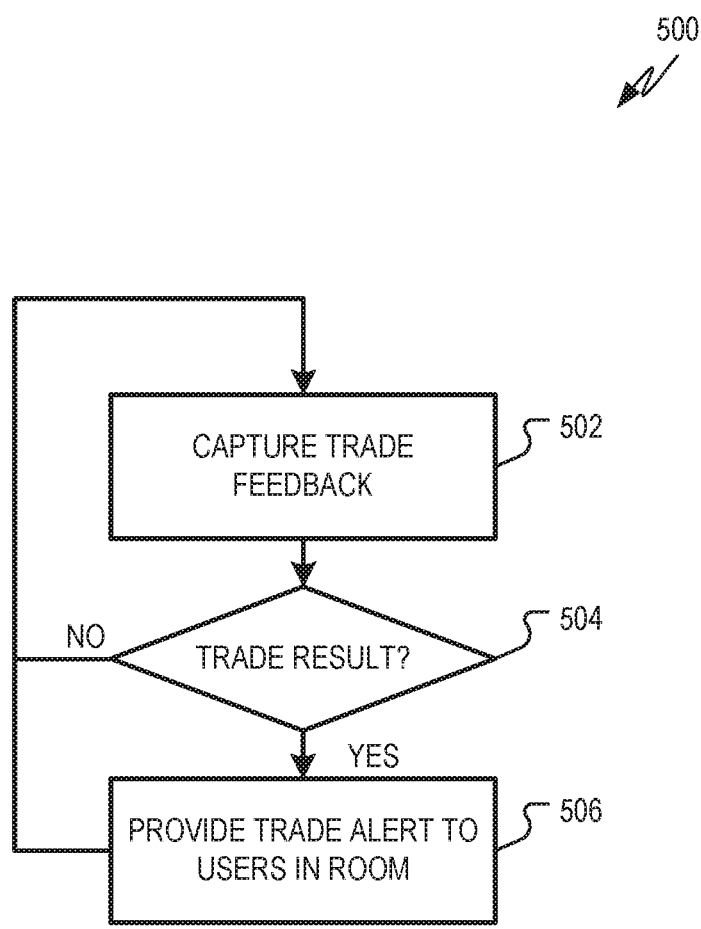
FIG. 5 is a flowchart showing one example of a process flow that may be executed in the environment of FIG. 1 to provide users with trade alert data.

FIG. 5 is a flowchart showing one example of a process flow 500 that may be executed in the environment 100 (e.g., by the VR system 102) to provide users with trade alert data. At operation 502, the VR system 102 may capture trade feedback, for example, from the trading system 104. Trade feedback may indicate the success or failure of trades requested by users receiving versions of a particular virtual reality UI. For example, trade feedback may indicate that a trade is successful or unsuccessful. Any suitable criteria may be used to determine the success or failure of a trade. For example, a trade may be successful if it successfully hedges another position, if it generates profit about a threshold profit level, etc.

At operation 504, the VR system 102 may determine whether a trade result is detected. A trade result may be detected, for example, if a trade requested by one of the users receiving a version of the virtual reality UI has been determined a success or a failure. If no trade result is detected, the VR system 102 may continue to capture trade feedback at operation 502. If a trade result is detected, the VR system 102 may, at operation 506, provide a trade alert message to some or all of the users receiving the virtual reality UI (e.g., in the virtual room depicted by the virtual reality UI). The alert may take any suitable form including, a sound, a visible indication, etc.

Figure 6:
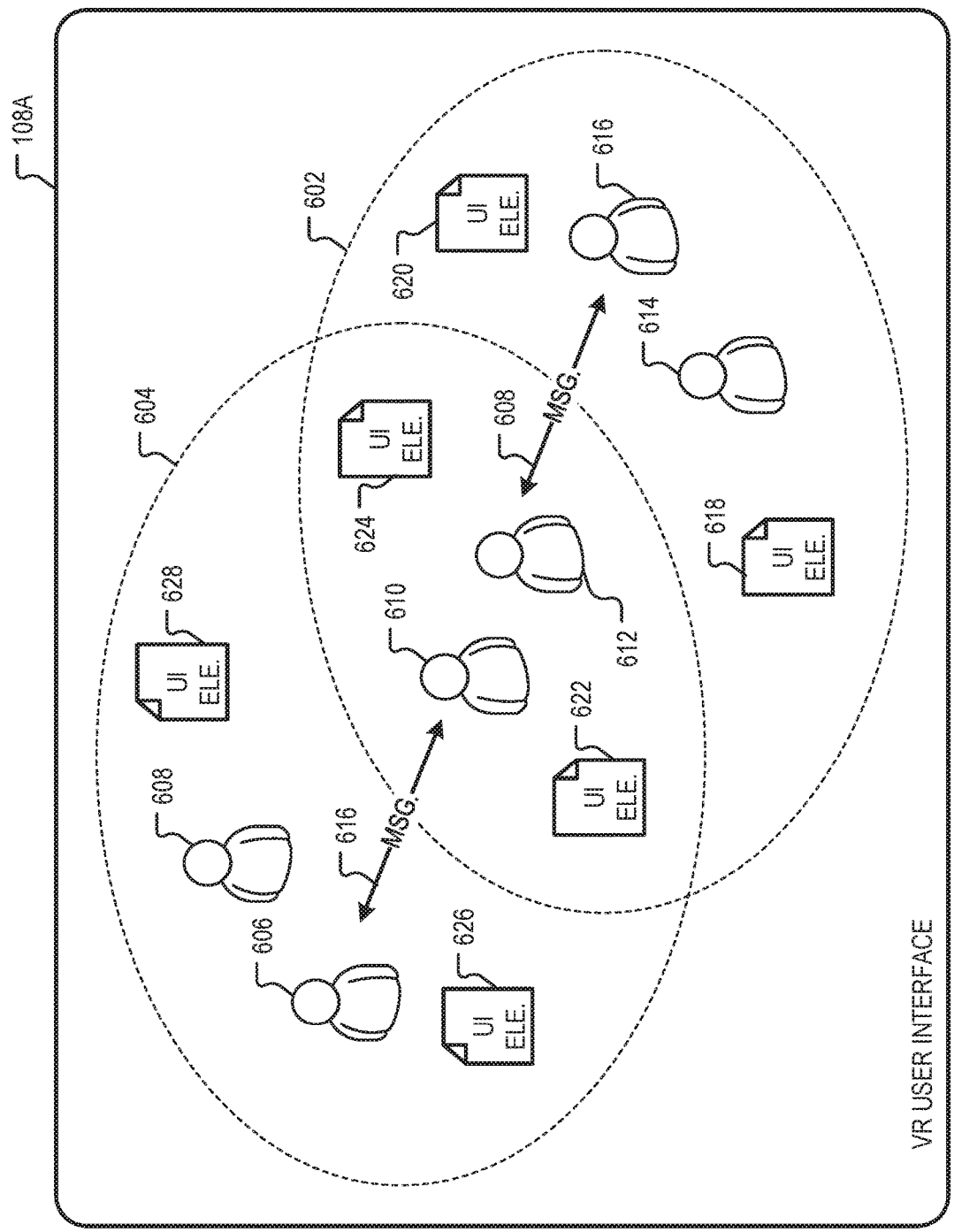
FIG. 6 is a diagram showing one example of the virtual reality UI of FIG. 1 illustrating differential access for users.

FIG. 6 is a diagram showing one example of the virtual reality UI 108A of FIG. 1 illustrating differential access for users. For example, FIG. 6 shows boundaries 602, 604 that indicate different versions of the virtual reality UI 108A, that may be provided to different users. For example, boundary 602 indicates a version of the virtual reality UI 108A provided to users corresponding to the avatars 614, 616. These users may be permitted to view and/or interact with other UI elements inside the boundary 602 including avatars 610, 612, 614, 616, and other UI elements 618, 620, 622, 624. The users corresponding to avatars 614, 616 may not be able to view and/or interact with UI elements outside of the boundary 604 including, for example, avatars 606, 608 and other UI elements 626, 628.

Similarly, boundary 604 indicates another version of the virtual reality UI 108A provided to users corresponding to avatars 606, 608. These users may lye permitted to view and/or interact with avatars 606, 608, 610, 612 and other UI elements 622, 624, 626, 628, but may not be permitted to see or interact with avatars 614, 616 and other UI elements 618, 620, FIG. 6 illustrates yet another version of the virtual reality UI 108A provided to the users corresponding to avatars 610, 612. These users may see and/or interact with all of the avatars and other UI elements shown in FIG. 6.

Differential access as shown in FIG. 6 may be used, for example, to permit different users to receive versions of the same virtual reality UI, such as 108A, without permitting all users to view and/or interact with all UI elements in the virtual reality UI. For example, users corresponding to avatars 610, 612 may be traders who trade securities for multiple client portfolios. Users corresponding to avatars 614, 616 may be associated with a first client while users corresponding to avatars 606, 608 may be associated with a second client. In this example, UI elements 614, 616, 618, 620 unavailable to the users corresponding to avatars 606, 608 may relate to the first client's portfolio and, thus, may not be available to the users of the second client.

Figure 7:
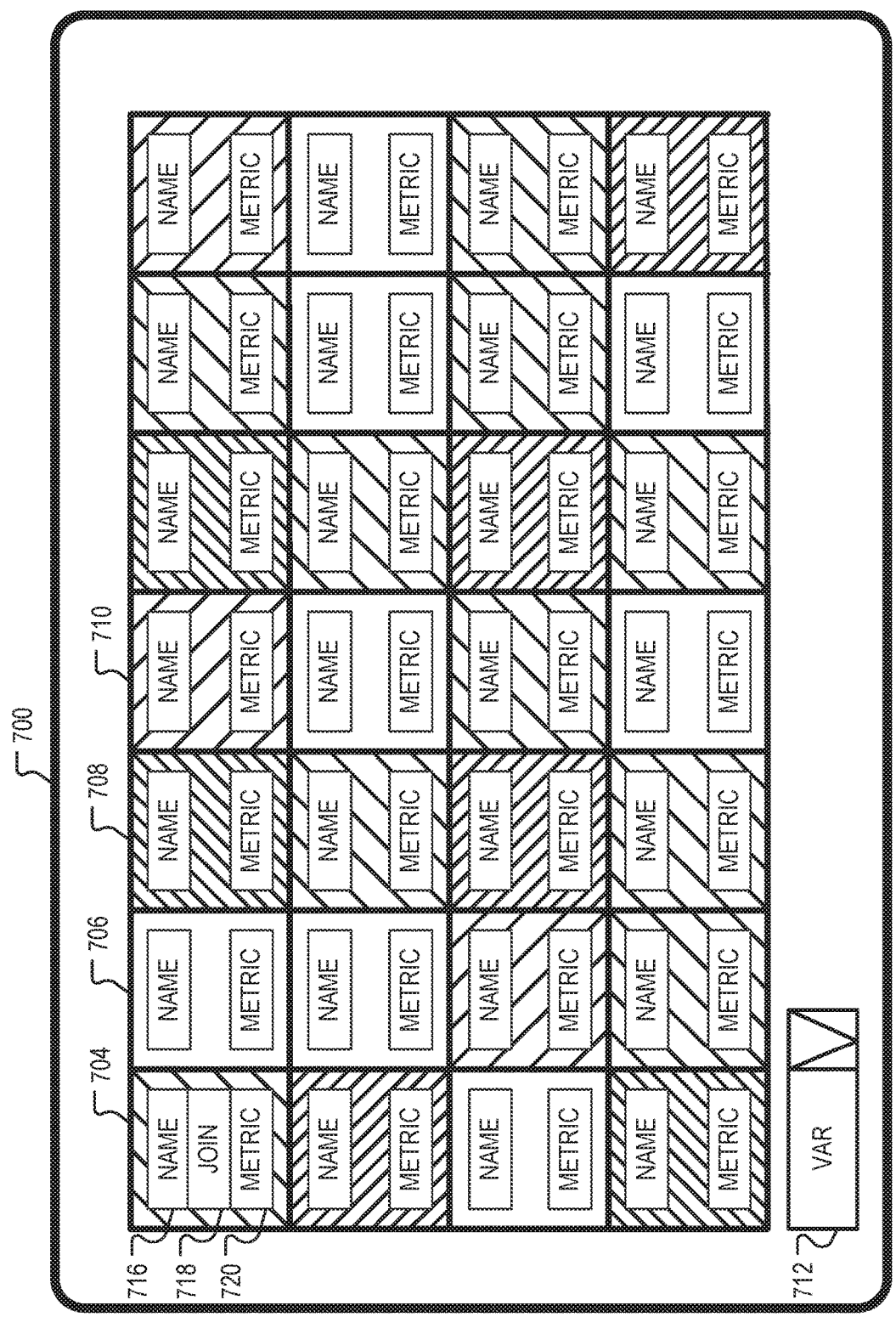
FIG. 7 is a diagram showing one example of administrator UI that may, be provided to an administrator user.

FIG. 7 is a diagram showing one example of administrator UI 700, similar to the administrator UI 134 of FIG. 1, that may be provided to an administrator user, such as the administrator user 138. The administrator UI 700 may be provided to the administrator user 138 on any sort of device having any sort of display. In some examples, the administrator UI 700 is a UI element of a virtual reality UI provided to the administrator user 138.

The administrator UI 700 includes various virtual room features, including the virtual room features 704, 706, 708, 710 individually labeled in FIG. 7. Virtual room features 704, 706, 708, 710 and other unlabeled virtual room features each correspond to respective virtual reality UIs provided to various users. The virtual room features 704, 706, 708, 710 indicate the value of one or more metrics describing trades made by users receiving the various virtual reality UIs. For example, the virtual room feature 704 may correspond to a first virtual reality UI and indicate a value or values for one or more metrics describing trades made by users receiving the first virtual reality UI.

In some examples, the trades made by users receiving a virtual reality UI (e.g., trades described by a virtual room feature, such as 704, 706, 708, 710) correspond to trades made by users in the virtual reality UI and may exclude other trades made by users receiving the virtual reality UI (e.g., trades in other virtual reality UIs). If a user is receiving more than one virtual reality UI, that user's trades may be described by one virtual room feature or multiple virtual reality features. In some examples, all of the trades made by the user may be described by one virtual room feature, (e.g., a virtual room feature corresponding to a primary or home virtual reality UI assigned to the user). In other examples, trades of the user receiving more than one virtual reality UI may be described by different virtual room features, for example, based on how the user enters trades. For example, trades that the user requests via UI elements in a first virtual reality UI may be described by a first virtual room feature corresponding to the first virtual reality UI and trades that the user requests via UI elements in a second virtual reality UI may be described by a second virtual room feature corresponding to the second virtual reality UL In some examples, trades may be trades of the user receiving more than one virtual reality UI may be described by different virtual room features based on properties of the requested trade. For example, a trade corresponding to a particular portfolio or desk may be described by a virtual room feature for a virtual reality UI for that portfolio or desk.

Virtual room features 704, 706, 708, 710 indicate the value of one or more metrics describing the trades of users receiving the corresponding virtual reality UI in any suitable way. Any suitable metric may be displayed including, for example, a trade volume, a VAR, a number of trades, etc. The value of a metric may be indicated at a virtual room feature 704, 706, 708, 710 in any suitable manner. In the example of FIG. 7, the virtual room features, including virtual room features 704, 706, 708, 710 are color or texture coded. For example, different colors or texture indicate different values or ranges of values for the displayed metric. In some examples, the colors may be selected to form a heat map. For example, values or ranges of values for the selected metric that are risky or otherwise problematic may be indicated by orange and red colors. Values or ranges of values for the selected metric that are less risky or otherwise problematic may be indicated by yellow colors. Values or ranges of values for the selected metric that indicate low levels of risk or other problems may be indicated by blue colors. Any other suitable color scheme may be used.

Virtual room features 704, 706, 708, 710 may include items that indicate the virtual reality UI which the features describe. For example, virtual room feature 704 has a name field 716 that indicates the name of the virtual room feature 704 and/or the virtual reality UI that it describes. A metric field 720 may describe the metric whose value is indicated by the virtual room feature (e.g., the color or texture). Other virtual room features 706, 708, 710 etc. may have similar name fields and/or metric fields, which are un-numbered in FIG. 7. The example virtual room feature 704 also includes a join feature 718. The administrator user 138 may select the join feature 718 to "join" the virtual reality UI corresponding to the virtual room feature 704. When the administrator user 138 selects the join feature 718, the administrator user 138 may begin receiving the virtual reality UI corresponding to the virtual room feature 704. For example, the administrator user 138 may be provided with functionality to view UI elements in the virtual reality UI and/or communicate with other users receiving the virtual reality UI.

In some examples, the administrator UI 700 includes a filter menu 712. The filter menu 712 may permit the administrator user to select the metric or metrics that are indicated by the virtual room features. In some examples, the filter menu 712 is a drop-down menu, although any other suitable type of menu or input field may be used.

Figure 8:
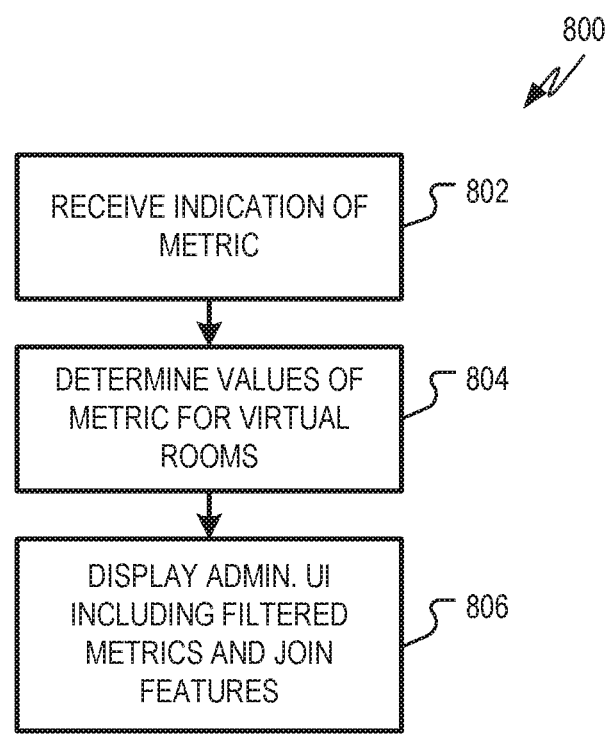
FIG. 8 is a flowchart showing one example of a process flow that may be executed by a VR system to generate an administrator UI.

FIG. 8 is a flowchart showing one example of a process flow 800 that may be executed by a VR system, such as the VR system 102, to generate the administrator UI 700. At operation 802, the VR system 102 may receive an indication of a metric filter. For example, referring to FIG. 7, the VR system 102 may receive the indication of the metric from the administrator user via the filter menu 712. At operation 804, the VR system 102 may determine values of the indicated metric for some or all of the virtual reality UIs. At operation 806, the VR system 102 may display an administrator UI including virtual room features for the respective virtual reality UIs. Some or all of the virtual room features may include or be associated with a join feature or other object selectable by the administrator use to begin to receive the corresponding virtual reality UI.

Figure 9:
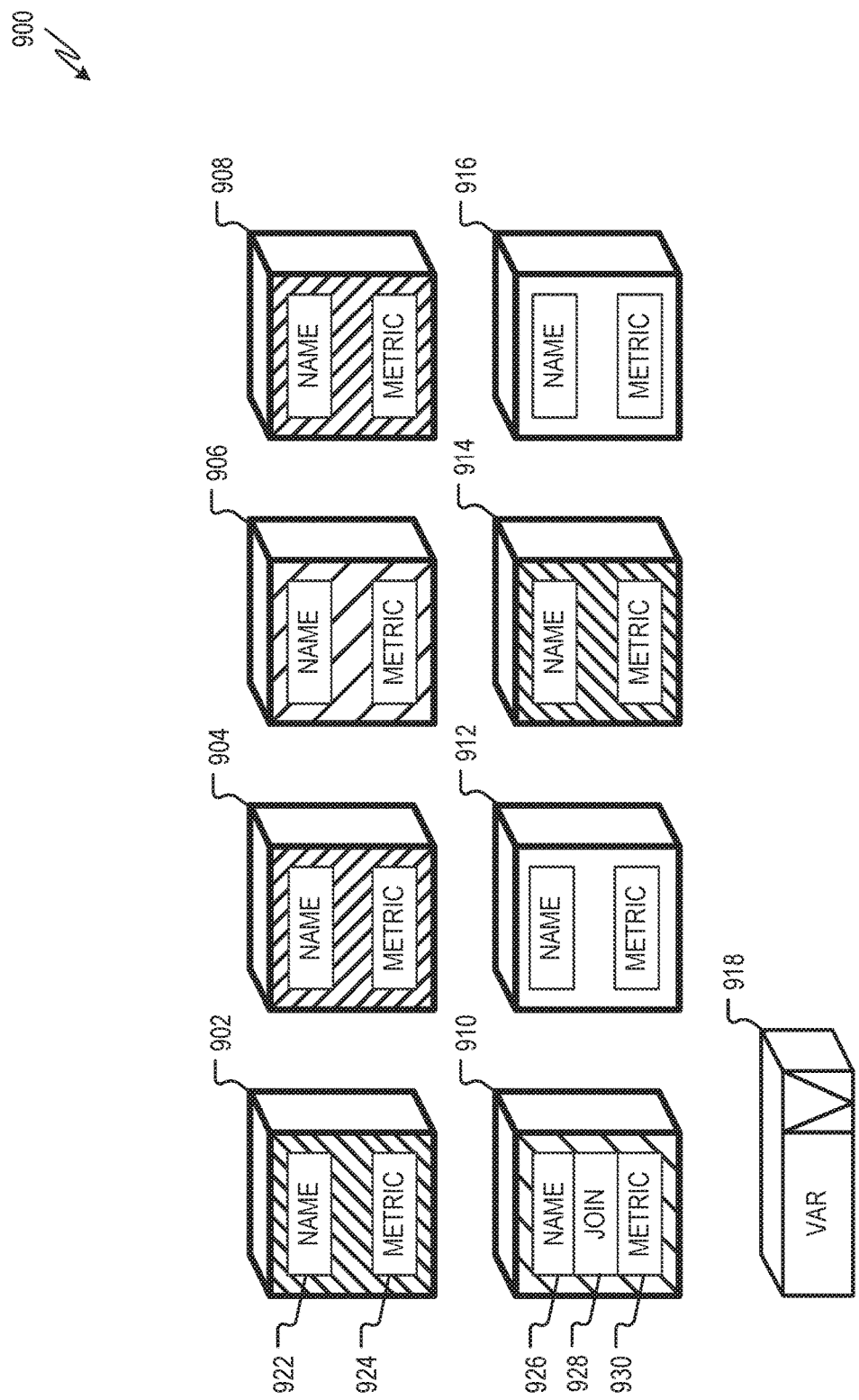
FIG. 9 is diagram showing another example of an administrator UI.

FIG. 9 is diagram showing another example of an administrator UI 900. The administrator UI 900 includes virtual room features 902, 904, 906, 908, 910, 912, 914, 916 and a metric filter field 918 that may be similar to the virtual room features 704, 706, 708, 710, etc. and filter menu 712 shown in FIG. 7. The administrator UI 900 of FIG. 9 shows the virtual room features 902, 904, 906, 908, 910, 912, 914, 916, for example, as they might be displayed in three-dimensional form, for example, when the UI 900 is a virtual reality UI In the example of FIG. 9, virtual room feature 902 includes an example name field 922 and metric field 924. The virtual room feature 910 includes an example name field 926, metric field 930, and join feature 928 that may cause the VR system to provide the virtual reality UI corresponding to the virtual room feature 910 to the administrator user as described herein.

Figure 10:
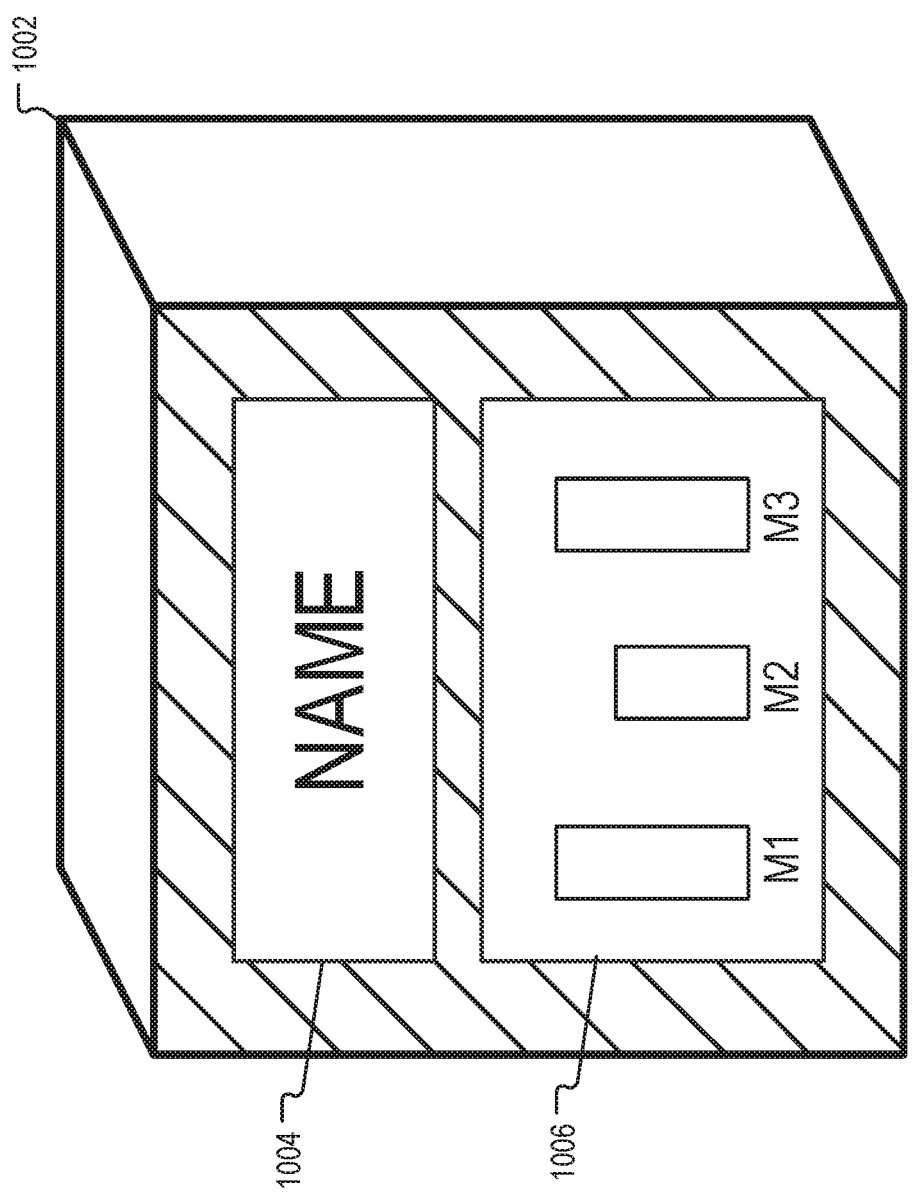
FIG. 10 is a diagram showing one example of a virtual room feature including indications for additional values of virtual UT metrics.

FIG. 10 is a diagram showing one example of a virtual room feature 1002 including indications for additional values of virtual UI metrics. The virtual room feature 1002 includes a name field 1004 and an additional metric field 1006. The additional metric field may include numerical or graphical indicates of values for additional metrics, indicated as M1, M2, and M3. In some examples, color, texture, etc. of the virtual room feature 1002 outside of the other fields 1004, 1006 may indicate a value for a metric also, for example, by its color or texture as described herein.

The virtual room feature 1002 may be included in the administrator UI 900 and/or the administrator UT 700. For example, the virtual room feature 1002 is shown in three-dimensional form, similar to the virtual room features 902, 904, 906, 908, 910, 912, 914, 916 of FIG. 9. In some examples, the virtual room feature 1002 may be presented in a two-dimensional form, similar to the virtual room features 704, 706, 708, 710 of FIG. 7.

Figure 11:
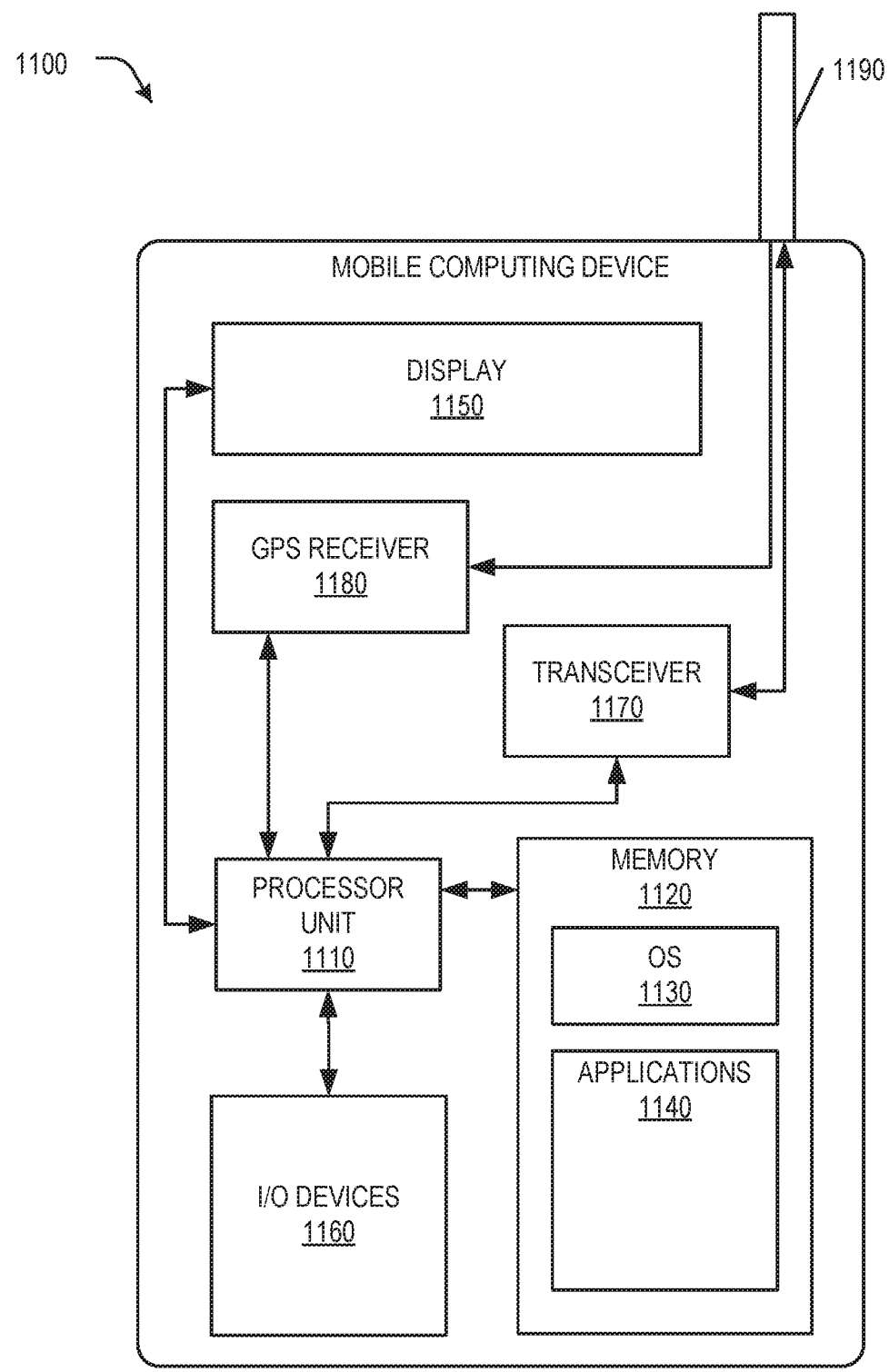
FIG. 11 is a block diagram showing an example architecture of a user computing device.

FIG. 11 is a block diagram showing an example architecture 1100 of a user computing device. The architecture 1100 may, for example, describe any of the computing devices described. The architecture 1100 comprises a processor unit 1110. The processor unit 1110 may include one or more processors. Any of a variety of different types of commercially available processors suitable for user computing devices may be used (for example, an XScale architecture microprocessor, a microprocessor without interlocked pipeline stages (MPS) architecture processor, or another type of processor). A memory 1120, such as a random access memory (RAM), a Flash memory, or other type of memory or data storage, is typically accessible to the processor. The memory 1120 may be adapted to store an operating system (OS) 1130, as well as application programs 1140.

The processor unit 1110 may be coupled, either directly or via appropriate intermediary hardware, to a display 1150 and to one or more input/output (I/O) devices 1160, such as a keypad, a touch panel sensor, a microphone, and the like, Such I/O devices 1160 may include a touch sensor for capturing fingerprint data, a camera for capturing one or more images of the user, a retinal scanner, or any other suitable devices. Similarly, in some examples, the processor unit 1110 may be coupled to a transceiver 1170 that interfaces with an antenna 1190. The transceiver 1170 may be configured to both transmit and receive cellular network signals, wireless data signals, or other types of signals via the antenna 1190, depending on the nature of the user computing device implemented by the architecture 1100. Although one transceiver 1170 is shown; in some examples, the architecture 1100 includes additional transceivers. For example, a wireless transceiver 1170 may be utilized to communicate according to an IEEE 802.11 specification, such as Wi-Fi and/or a short-range communication medium. Some short-range communication mediums, such as NFC, may utilize a separate, dedicated transceiver 1170. Further, in some configurations, a Global Positioning System (GPS)

receiver 1180 may also make use of the antenna 1190 to receive GPS signals. In addition to or instead of the GPS receiver 1180, any suitable location-determining sensor may be included and/or used including, for example, a Wi-Fi positioning system. In some examples, the architecture 1100 (e.g., processor unit 1110) may also support a hardware interrupt. In response to a hardware interrupt, the processor unit 1110 may pause its processing and execute an interrupt service routine (TSR).

Figure 12:
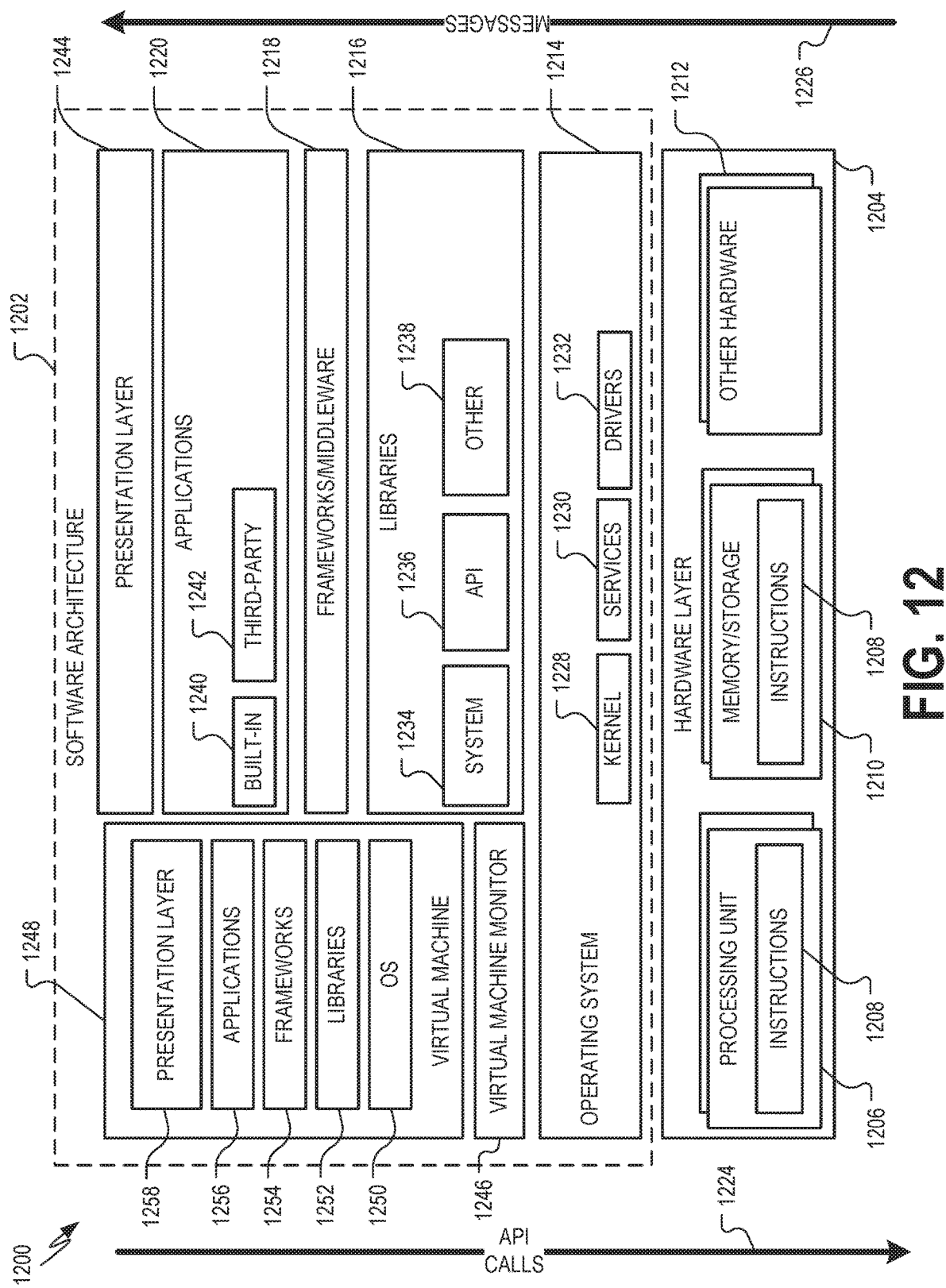
FIG. 12 is a block diagram showing one example of a software architecture for a computing device.

FIG. 12 is a block diagram 1200 showing one example of a software architecture 1202 for a computing device. The architecture 1202 may be used in conjunction with various hardware architectures, for example, as described herein. FIG. 12 is merely a non-limiting example of a software architecture 1202 and many other architectures may be implemented to facilitate the functionality described herein. A representative hardware layer 1204 is illustrated and can represent, for example, any of the above referenced computing devices. In some examples, the hardware layer 1204 may be implemented according to the architecture 1100 of FIG. 11 and/or the architecture 1300 of FIG. 13.

The representative hardware layer 1204 comprises one or more processing units 1206 having associated executable instructions 1208. Executable instructions 1208 represent the executable instructions of the software architecture 1202, including implementation of the methods, modules, components, and so forth of FIGS. 1-9. Hardware layer 1204 also includes memory and/or storage modules 1210, which also have executable instructions 1208. Hardware layer 1204 may also comprise other hardware as indicated by other hardware 1212, which represents any other hardware of the hardware layer 1204, such as the other hardware illustrated as part of hardware architecture 1400.

In the example architecture of FIG. 12, the software 1202 may be conceptualized as a stack of layers where each layer provides particular functionality. For example, the software 1202 may include layers such as an operating system 1214, libraries 1216, frameworks/middleware 1218, applications 1220, and presentation layer 1244. Operationally, the applications 1220 and/or other components within the layers may invoke application programming interface (API) calls 1224 through the software stack and receive a response, returned values, and so forth, illustrated as messages 1226, in response to the API calls 1224. The layers illustrated are representative in nature and not all software architectures have all layers. For example, some mobile or special purpose operating systems may not provide a frameworks/middleware layer 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of a hardware or software interrupt and, in response, cause the architecture 1202 to pause its current processing and execute an ISR when an interrupt is received. The TSR may generate the alert, for example, as described herein.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display 1150), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various GUI functions, high-level resource management, high-level location services, and so forth. The frameworks 1218 may provide a broad spectrum of other APIs that may be utilized by the applications 1220 and/or other software components/modules, some of which may be specific to a particular operating system 1214 or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems 1214. In this example, the third-party application 1242 may invoke the API calls 1224 provided by the mobile operating system such as operating system 1214 to facilitate functionality described herein.

The applications 1220 may utilize built-in operating system functions (e.g., kernel 1228, services 1230 and/or drivers 1232), libraries (e.g., system 1234, APIs 1236, and other libraries 1238), frameworks/middleware 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures 1202 utilize virtual machines. For example, systems described herein may be executed utilizing one or more virtual machines executed at one or more server computing machines. In the example of FIG. 12, this is illustrated by virtual machine 1248. A virtual machine 1248 creates a software environment where applications 1220/modules can execute as if they were executing on a hardware computing device. A virtual machine 1248 is hosted by a host operating system (operating system 1214) and typically, although not always, has a virtual machine monitor 1246, which manages the operation of the virtual machine 1248 as well as the interface with the host operating system (i.e., operating system 1214). A software architecture executes within the virtual machine 1248 such as an operating system 1250, libraries 1252, frameworks/middleware 1254, applications 1256, and/or presentation layer 1258. These layers of software architecture executing within the virtual machine 1248 can be the same as corresponding layers previously described or may be different.

Figure 13:
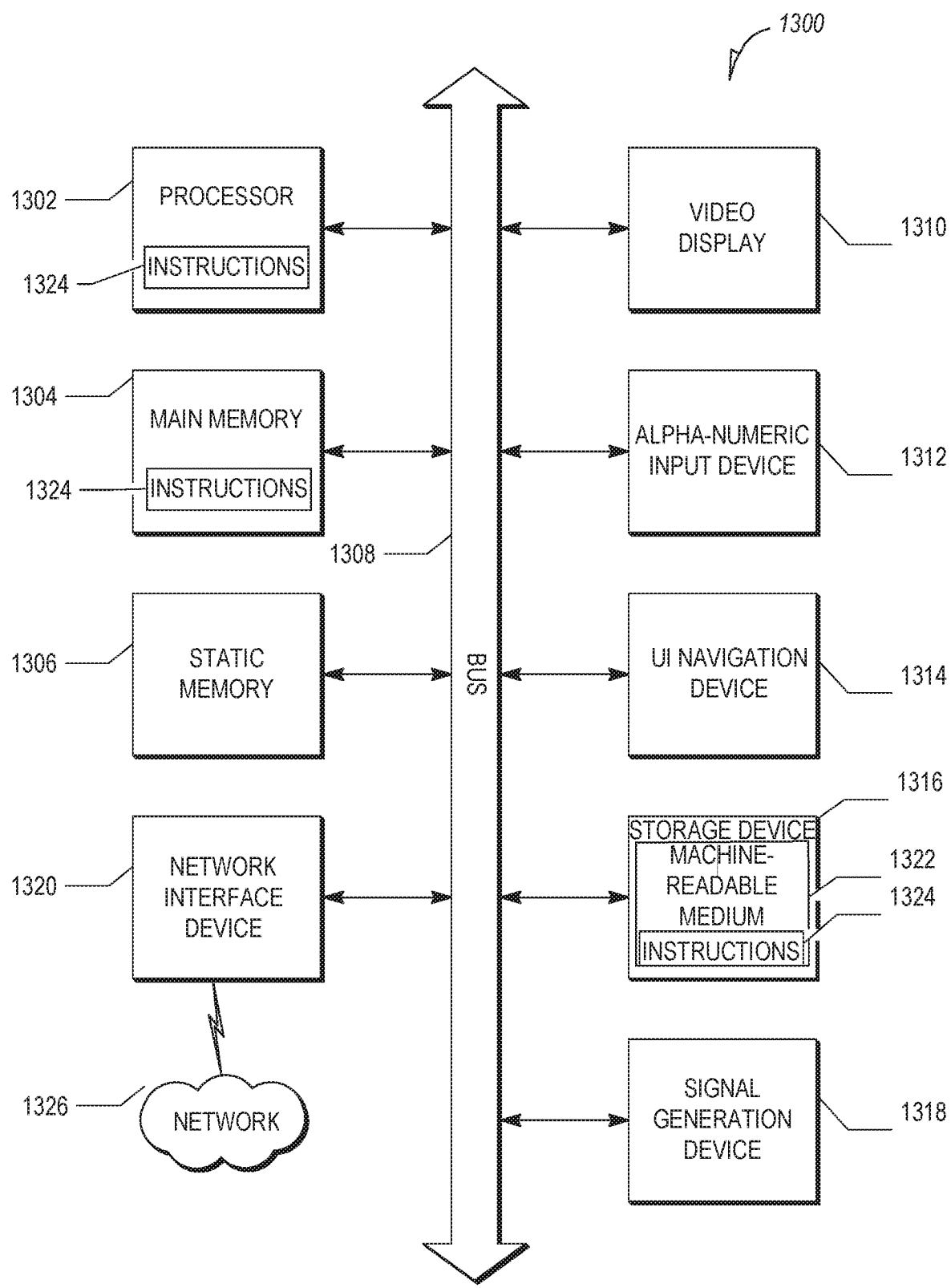
FIG. 13 is a block diagram illustrating a computing device hardware architecture, within which a set or sequence of instructions can be executed to cause the machine to perform examples of any one of the methodologies discussed herein.

FIG. 13 is a block diagram illustrating a computing device hardware architecture 1300, within which a set or sequence of instructions 1208 can be executed to cause the machine to perform examples of any one of the methodologies discussed herein. For example, the architecture 1300 may execute the software architecture 1202 described with respect to FIG. 12. The architecture 1300 may operate as a standalone device or may be connected (e.g., networked) to other machines. In a networked deployment, the architecture 1300 may operate in the capacity of either a server or a client machine in server-client network environments, or it may act as a peer machine in peer-to-peer (or distributed) network environments. The architecture 1300 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions 1208 (sequential or otherwise) that specify operations to be taken by that machine.

Example architecture 1300 includes a processor unit 1302 comprising at least one processor (e.g., a central processing unit (CPU), a graphics processing unit (GPU) or both, processor cores, compute nodes, etc.). The architecture 1300 may further comprise a main memory 1304 and a static memory 1306, which communicate with each other via a link 1308 (e.g., bus). The architecture 1300 can further include a video display unit 1310, an alphanumeric input device 1312 (e.g., a keyboard), and a UI navigation device 1314 (e.g., a mouse). In some examples, the video display unit 1310, input device 1312, and UI navigation device 1314 are incorporated into a touch screen display. The architecture 1300 may additionally include a storage device 1316 (e.g., a drive unit), a signal generation device 1318 (e.g., a speaker), a network interface device 1320, and one or more sensors (not shown), such as a GPS sensor, compass, accelerometer, or other sensor.

In some examples, the processor unit 1302 or other suitable hardware component may support a hardware interrupt. In response to a hardware interrupt, the processor unit 1302 may pause its processing and execute an TSR, for example, as described herein.

The storage device 1316 includes a machine-readable medium 1322 on which is stored one or more sets of data structures and instructions 1324 (e.g., software) embodying or utilized by any one or more of the methodologies or functions described herein. The instructions 1324 can also reside, completely or at least partially, within the main memory 1304, static memory 1306, and/or within the processor unit 1302 during execution thereof by the architecture 1300, with the main memory 1304, static memory 1306, and the processor unit 1302 also constituting machine-readable media 1322. Instructions 1324 stored at the machine-readable medium 1322 may include, for example, instructions for implementing the software architecture 1202, instructions for executing any of the features described herein, etc.

While the machine-readable medium 1322 is illustrated in an example to be a single medium, the term "machine-readable medium" can include a single medium or multiple media (e.g., a centralized or distributed database, and/or associated caches and servers) that store the one or more instructions 1324. The term "machine-readable medium" shall also be taken to include any tangible medium that is capable of storing, encoding, or carrying instructions 1324 for execution by the machine and that cause the machine to perform any one or more of the methodologies of the present disclosure or that is capable of storing, encoding or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1324 can further be transmitted or received over a communications network 1326 using a transmission medium via the network interface device 1320 utilizing any one of a number of well-known transfer protocols (e.g., HTTP). Examples of communication networks 1326 include a LAN, a WAN, the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions 1324 for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions 1324 that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A virtual reality trading tool, comprising:
   a computing device comprising a processor unit and a memory in communication with the processor unit, wherein the computing device is programmed to perform operations comprising:
   receiving a first ambient noise signal from a first trader computing device;
   receiving a second ambient noise signal from a second trader computing device;
   receiving an ambient feedback request message from a third trader computing device;
   sending to the third trader computing device an aggregated ambient noise signal based, at least in part, on the first ambient noise signal and the second ambient noise signal;
   receiving, from a first administrator user computing device, an indication of a first metric;
   generating a first value of the first metric for a first plurality of trades requested by a first set of users receiving a first virtual reality user interface (UI) corresponding to a first virtual room;
   generating a second value of the first metric for a second plurality of trades requested by a second set of users receiving a second virtual reality UI corresponding to a second virtual room; and
   serving, to the administrator user computing device, an administrator UI, comprising:
      a first virtual room feature indicating the first value for the first metric;
      a first join feature associated with the first virtual room feature and selectable by an administrator user of the administrator user computing device to join the first virtual room;
      a second virtual room feature indicating the second value for the first metric; and
      a second join feature associated with the second virtual room feature and selectable by administrator user to join the second virtual room.

2. The virtual reality trading tool of claim 1, wherein the first plurality of trades comprises a first trade requested by a first user of the first set of users and a second trade requested by a second user of the first set of users.

3. The virtual reality trading tool of claim 1, wherein the computing device is further programmed to perform operations comprising:
   receiving, from the administrator user computing device, an indication that the administrator user has selected the first join feature; and
   providing the first virtual reality UI to the administrator user computing device.

4. The virtual reality trading tool of claim 1, wherein the computing device is further programmed to perform operations comprising:
   determining a first set of virtual reality UI features that a first user associated with a first user computing device is permitted to receive via a first virtual reality user interface (UI);
   providing a first version of the first virtual reality UI to the first user computing device, the first version of the first virtual reality UI comprising the first set of virtual reality UI features;
   determining a second set of virtual reality UI features that a second user associated with a second user computing device is permitted to receive via the first virtual reality UI, wherein the first set of virtual reality UI features comprises at least one virtual reality UI feature that is not in the second set of virtual reality UI features; and
   providing a second version of the first virtual reality UI to the second user computing device, the second version of the first virtual reality UI comprising the second set of virtual reality UI features.

5. The virtual reality trading tool of claim 1, wherein the computing device is further programmed to perform operations comprising:
   determining that a first user associated with a first user computing device is permitted to interact with a first trader user at a first virtual room of a first virtual reality user interface (UI);
   determining that the first user is not permitted to interact with a second trader user at the first virtual room;
   determining that a second user associated with a second user computing device is permitted to interact with the second trader user at the first virtual room; and
   providing a first version of the first virtual reality UI to the first user computing device, wherein the first version of the first virtual reality UI comprises a first avatar corresponding to the first trader user; and
   providing a second version of the first virtual reality UI to the second user computing device, wherein the second version of the first virtual reality UI comprises a second avatar corresponding to the second trader user.

6. The virtual reality trading tool of claim 5, wherein the computing device is further programmed to perform operations comprising:
   receiving, from the first user computing device, a message directed to the first trader user; and
   sending the message to a first trader user computing device associated with the first trader.

7. The virtual reality trading tool of claim 1, wherein the computing device is further programmed to perform operations comprising:
   receiving, from a trading computing device, an indication that a first trade of the first plurality of trades is complete; and
   sending a trade alert message to the first set of users to modify the first virtual reality UI to indicate the first trade.

8. A virtual trading method comprising:
   receiving a first ambient noise signal from a first trader computing device;
   receiving a second ambient noise signal from a second trader computing device;
   receiving an ambient feedback request message from a third trader computing device;
   sending to the third trader computing device an aggregated ambient noise signal based, at least in part, on the first ambient noise signal and the second ambient noise signal;

receiving, by a processor unit and from a first administrator user computing device, an indication of a first metric;

generating, b the processor unit, a first value of the first metric for a first plurality of trades requested by a first set of users receiving a first virtual reality user interface (UI) corresponding to a first virtual room;

generating, by the processor unit, a second value of the first metric for a second plurality of trades requested by a second set of users receiving a second virtual reality UI corresponding to a second virtual room; and serving, by the processor unit and to the administrator user computing device, an administrator UI, comprising:

a first virtual room feature indicating the first value for the first metric;

a first join feature associated with the first virtual room feature and selectable by an administrator user of the administrator user computing device to join the first virtual room;

a second virtual room feature indicating the second value for the first metric; and a second join feature associated with the second virtual room feature and selectable by administrator user to join the second virtual room.

9. The virtual trading method of claim 8, wherein the first plurality of trades comprises a first trade requested by a first user of the first set of users and a second trade requested by a second user of the first set of users.

10. The virtual trading method of claim 8, further comprising:

receiving, from the administrator user computing device, an indication that the administrator user has selected the first join feature; and providing the first virtual reality UI to the administrator user computing device.

11. The virtual trading method of claim 8, further comprising:

determining a first set of virtual reality UI features that a first user associated with a first user computing device is permitted to receive via a first virtual reality user interface (UI);

providing a first version of the first virtual reality UI to the first user computing device, the first version of the first virtual reality UI comprising the first set of virtual reality UI features;

determining a second set of virtual reality UI features that a second user associated with a second user computing device is permitted to receive via the first virtual reality UI, wherein the first set of virtual reality UI features comprises at least one virtual reality UI feature that is not in the second set of virtual reality UI features; and providing a second version of the first virtual reality UI to the second user computing device, the second version of the first virtual reality UI comprising the second set of virtual reality UI features.

12. The virtual trading method of claim 8, further comprising:

determining that a first user associated with a first user computing device is permitted to interact with a first trader user at a first virtual room of a first virtual reality user interface (UI);

determining that the first user is not permitted to interact with a second trader user at the first virtual room;

determining that a second user associated with a second user computing device is permitted to interact with the second trader user at the first virtual room; and providing a first version of the first virtual reality to the first user computing device, wherein the first version of the first virtual reality UI comprises a first avatar corresponding to the first trader user; and providing a second version of the first virtual reality UI to the second user computing device, wherein the second version of the first virtual reality UI comprises a second avatar corresponding to the second trader user.

13. The virtual trading method of claim 12, further comprising:

receiving, from the first user computing device, a message directed to the first trader user; and sending the message to a first trader user computing device associated with the first trader.

14. The virtual trading method of claim 8, further comprising:

receiving, from a trading computing device, an indication that a first trade of the first plurality of trades is complete; and sending a trade alert message to the first set of users to modify the first virtual reality UI to indicate the first trade.

15. At least one non-transitory machine-readable medium comprising instructions thereon that, when executed by at least one processor unit, cause the at least one processor unit to perform operations comprising:

receiving a first ambient noise signal from a first trader computing device;

receiving a second ambient noise signal from a second trader computing device;

receiving an ambient feedback request message from a third trader computing device;

sending to the third trader computing device an aggregated ambient noise signal based, at least in part, on the first ambient noise signal and the second ambient noise signal;

receiving, by a processor unit and from a first administrator user computing device, an indication of a first metric;

generating, by the processor unit, a first value of the first metric for a first plurality of trades requested by a first set of users receiving a first virtual reality user interface (UI) corresponding to a first virtual room;

generating, by the processor unit, a second value of the first metric for a second plurality of trades requested by a second set of users receiving a second virtual reality UI corresponding to a second virtual room; and serving, b the processor unit and to the administrator user computing device, an administrator UI, comprising:

a first virtual room feature indicating the first value for the first metric;

a first join feature associated with the first virtual room feature and selectable by an administrator user of the administrator user computing device to join the first virtual room;

a second virtual room feature indicating the second value for the first metric; and a second join feature associated with the second virtual room feature and selectable by the administrator user to join the second virtual room.

16. The at least one machine-readable medium of claim 15, wherein the first plurality of trades comprises a first trade requested by a first user of the first set of users and a second trade requested by a second user of the first set of users.

17. The at least one machine-readable medium of claim 15, further comprising instructions thereon that, when executed by the at least one processor unit, cause the at least one processor unit to perform operations comprising:

receiving, from the administrator user computing device, an indication administrator user has selected the first join feature; and providing the first virtual reality UI to the administrator user computing device.

18. The at least one machine-readable medium of claim 15, further comprising instructions thereon that, when executed by the at least one processor unit, cause the at least one processor unit to perform operations comprising:

determining a first set of virtual reality UI features that a first user associated with a first user computing device is permitted to receive via a first virtual reality user interface (UI);

providing a first version of the first virtual reality UI to the first user computing device, the first version of the first virtual reality UI comprising the first set of virtual reality UI features;

determining a second set of virtual reality UI features that a second user associated with a second user computing device is permitted to receive via the first virtual reality UI, wherein the first set of virtual reality UI features comprises at least one virtual reality UI feature that is not in the second set of virtual reality UI features; and providing a second version of the first virtual reality UI to the second user computing device, the second version of the first virtual reality UI comprising the second set of virtual reality UI features.

* * * * *

UNITED STATES PATENT AND TRADEMARK OFFICE
CERTIFICATE OF CORRECTION

PATENT NO. : 10,732,811 B1  
APPLICATION NO. : 15/671725  
DATED : August 4, 2020  
INVENTOR(S) : Pasupuleti et al.

Page 1 of 1

It is certified that error appears in the above-identified patent and that said Letters Patent is hereby corrected as shown below:

In the Claims

In Column 15, Line 51, in Claim 1, after "by", insert --the--

In Column 17, Line 4, in Claim 8, delete "b" and insert --by-- therefor

In Column 17, Line 24, in Claim 8, after "by", insert --the--

In Column 18, Line 1, in Claim 12, after "reality", insert --UI--

In Column 18, Line 47, in Claim 15, delete "b" and insert --by-- therefor

In Column 19, Line 2, in Claim 17, after "indication", insert --that the--

Signed and Sealed this  
Ninth Day of March, 2021

Drew Hirshfeld  
*Performing the Functions and Duties of the  
Under Secretary of Commerce for Intellectual Property and  
Director of the United States Patent and Trademark Office*